(12) United States Patent
Fujimoto

(10) Patent No.: US 9,047,916 B2
(45) Date of Patent: Jun. 2, 2015

(54) RECORDING MEDIUM, CATEGORY CREATING APPARATUS, AND CATEGORY CREATING METHOD

(75) Inventor: Yoko Fujimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 159 days.

(21) Appl. No.: 13/614,143

(22) Filed: Sep. 13, 2012

(65) Prior Publication Data

US 2013/0071089 A1    Mar. 21, 2013

Related U.S. Application Data

(63) Continuation of application No. PCT/JP2010/055451, filed on Mar. 26, 2010.

(51) Int. Cl.

| | | |
|---|---|---|
| *G11B 27/00* | (2006.01) | |
| *H04N 5/93* | (2006.01) | |
| *G11B 27/10* | (2006.01) | |
| *G06F 17/30* | (2006.01) | |
| *H04N 5/92* | (2006.01) | |

(52) U.S. Cl.
CPC .......... *G11B 27/10* (2013.01); *G06F 17/30799* (2013.01); *G06F 17/3082* (2013.01); *G06F 17/30796* (2013.01)

(58) Field of Classification Search
USPC .......... 386/278, 280, 285, 326, 338, 339, 353
See application file for complete search history.

(56) References Cited

U.S. PATENT DOCUMENTS

| | | | | |
|---|---|---|---|---|
| 8,219,577 | B2 * | 7/2012 | Nakano et al. | ................ 707/767 |
| 2004/0131255 | A1 | 7/2004 | Ben-Yaacov et al. | |
| 2009/0043811 | A1 | 2/2009 | Yamamoto et al. | |
| 2009/0210791 | A1 * | 8/2009 | Proehl et al. | .................. 715/720 |

FOREIGN PATENT DOCUMENTS

| | | | | |
|---|---|---|---|---|
| EP | 1 357 746 | | 10/2003 | |
| JP | 11-265396 | * | 9/1999 | .............. G06F 17/30 |
| JP | 2006-515099 | | 5/2006 | |
| JP | 2006-190010 | | 7/2006 | |
| JP | 2007-26425 | | 2/2007 | |
| JP | 2010-15588 | | 1/2010 | |

(Continued)

OTHER PUBLICATIONS

Machine Translation of JP 11-265396, Sep. 1999, Minami et al.*

(Continued)

*Primary Examiner* — Daquan Zhao
(74) *Attorney, Agent, or Firm* — Staas & Halsey LLP

(57) ABSTRACT

A category creating apparatus receives a piece of music, extracts video image information included in the received music, and decomposes the extracted video image information with respect to each characteristic of the extracted video image information. Then, the category creating apparatus creates, with respect to each piece of decomposed video image information, a category representing the characteristic of the piece of video image information. The category creating apparatus extracts, from the video image information in the received music, character information and decomposes the extracted character information into words. The category creating apparatus creates, for each decomposed word, a category associated with the word.

7 Claims, 13 Drawing Sheets

| NO. | CATEGORY | APPEARANCE FREQUENCY m2 | APPEARANCE TIME (MINUTES) n2 | RELATIVE INCIDENCE (m2+n2)/(m1+n1) × 100(%) |
|---|---|---|---|---|
| 1 | WINTER | 12 | 10 | 80% |
| 2 | CHRISTMAS | 11 | 0 | 40% |
| ... | ... | ... | ... | ... |

(56) References Cited

FOREIGN PATENT DOCUMENTS

| | | |
|---|---|---|
| JP | 2010-66870 | 3/2010 |
| WO | WO 2004/061547 | 7/2004 |

OTHER PUBLICATIONS

European Office Action for corresponding European Application No. 10848430.4-1952; dated Aug. 2, 2013.

International Search Report of PCT/JP2010/055451 mailed Apr. 20, 2010.

Yuji Mogi, "News Eizochu no Moji Ninshiki ni Motozuku Kiji no Sakuinzuke", IEICE Technical Report, vol. 95, No. 582, Mar. 15, 1996, pp. 33-40.

Japanese Office Action issued Jul. 2, 2013 in corresponding Japanese Application No. 2012-506747.

Yusuke Ebata et al. "Interactive Suggestion of Related Videos by Analyzing Users' Comments Based on tf-idf Scheme", The Institute of Electronics, Information and Communication Engineers, pp. 7-10.

Chinese Office Action issued Nov. 2, 2014 in corresponding Chinese Patent Application No. 201080065677.3.

* cited by examiner

FIG.3

| NO. | SCENE CHARACTERISTIC | CATEGORY 1 | CATEGORY 2 | CATEGORY 3 |
|---|---|---|---|---|
| 1 | MUCH SNOW | SNOW | WINTER | WHITE |
| 2 | WITH CHRISTMAS LIGHTS | NIGHT | CHRISTMAS | |
| ... | ... | ... | ... | ... |

FIG.4

| NO. | WORD | CATEGORY 1 | CATEGORY 2 | CATEGORY 3 |
|---|---|---|---|---|
| 1 | SNOW | SNOW | WINTER | WHITE |
| 2 | SANTA CLAUS | CHRISTMAS | WINTER | |
| ... | ... | ... | ... | ... |

FIG.5

| NO. | CATEGORY | APPEARANCE FREQUENCY m2 | APPEARANCE TIME (MINUTES) n2 | RELATIVE INCIDENCE (m2+n2)/(m1+n1) × 100(%) |
|---|---|---|---|---|
| 1 | WINTER | 12 | 10 | 80% |
| 2 | CHRISTMAS | 11 | 0 | 40% |
| ... | ... | ... | ... | ... |

FIG.6

| NO. | FILE NAME | START POSITION OF MUSIC | END POSITION OF MUSIC | TV PROGRAM TITLE | DATE AND TIME OF BROADCAST TV PROGRAM | MUSIC TITLE | NAME OF PERFORMER OF MUSIC | NAME OF LYRICIST OF MUSIC | NAME OF COMPOSER OF MUSIC | LYRICS OF MUSIC | CATEGORY |
|---|---|---|---|---|---|---|---|---|---|---|---|
| 1 | A | 0:11:15 | 0:16:30 | AAA | 2009.01.02 | CHRISTMAS SONG | aaa | aaa | aaa | ABCDE ... | WINTER 80% / CHRISTMAS 40% |
| 2 | A | 0:32:48 | 0:35:11 | AAA | 2009.01.02 | BIRTHDAY SONG | bbb | abc | aaa | FGHIJ ... | BIRTHDAY 25% |
| 3 | B | 0:12:58 | 0:17:03 | BBB | 2009.04.14 | WINTER SONG | aaa | aaa | bbb | KLMNO | WINTER 60% / FAREWELL 15% |
| 4 | C | 1:23:55 | 1:27:02 | | | NO TITLE 1 | | | | | FUJITA KAZUO 70% |

FIG.7

| | TITLE | PERFOR-MER OF MUSIC | DATE AND TIME OF BROADCAST TV PROGRAM | TV PRO-GRAM TITLE | CATEGORY | | |
|---|---|---|---|---|---|---|---|
| ▶ | CHRISTMAS SONG | aaa | 2009.01.02 | AAA | WINTER 80% | CHRIST-MAS 40% | DISPLAY DETAILED DATA |
| ▶ | BIRTHDAY SONG | bbb | 2009.01.02 | AAA | BIRTH-DAY 25% | | DISPLAY DETAILED DATA |

MUSIC VIDEO IMAGE LIST IN PC

■DISPLAY ALL TITLES■  [CHANGE DISPLAY]

[ADD MUSIC]  [EDIT MUSIC INFORMATION]

FIG.8

MUSIC VIDEO IMAGE LIST IN PC

■MUSIC INFORMATION EDITING SCREEN■

| NO. | FILE NAME | START POSITION OF MUSIC | END POSITION OF MUSIC | TV PROGRAM TITLE | DATE AND TIME OF BROADCAST TV PROGRAM | MUSIC TITLE | NAME OF PERFORMER OF MUSIC | NAME OF LYRICIST OF MUSIC | NAME OF COMPOSER OF MUSIC | LYRICS OF MUSIC | CATEGORY |
|---|---|---|---|---|---|---|---|---|---|---|---|
| 1 | A | 00:11:15 | 00:16:30 | AAA | 2009.01.02 | CHRISTMAS SONG | aaa | aaa | aaa | ABCDE ... | WINTER 80% / CHRISTMAS 40% |
| 2 | A | 00:32:48 | 00:35:11 | AAA | 2009.01.02 | BIRTHDAY SONG | bbb | abc | aaa | FGHIJ ... | BIRTHDAY 25% |
| 3 | B | 00:12:58 | 00:17:03 | BBB | 2009.04.14 | WINTER SONG | aaa | aaa | bbb | KLMNO | WINTER 60% / FAREWELL 15% |
| 4 | C | 01:23:55 | 01:27:02 | | | NO TITLE 1 | | | | | FUJITA KAZUO 70% |

[COMPLETE] [CANCEL]

FIG.10

| MUSIC VIDEO IMAGE LIST IN PC | | | | | | |
|---|---|---|---|---|---|---|
| ■DISPLAY PER DIFFERENT CATEGORIES■ [CHANGE DISPLAY] | | | | | | |
| ☐WINTER | | | | | | |
| | TITLE | PERFORMER OF MUSIC | DATE AND TIME OF BROADCAST TV PROGRAM | TV PROGRAM TITLE | CATEGORY PERCENTAGE | |
| ▶ | CHRISTMAS SONG | aaa | 2009.01.02 | AAA | 80% | DISPLAY DETAILED DATA |
| ▶ | WINTER SONG | aaa | 2009.04.14 | BBB | 60% | DISPLAY DETAILED DATA |
| ☐FAREWELL | | | | | | |
| | TITLE | PERFORMER OF MUSIC | DATE AND TIME OF BROADCAST TV PROGRAM | TV PROGRAM TITLE | CATEGORY PERCENTAGE | |
| ▶ | WINTER SONG | aaa | 2009.04.14 | BBB | 15% | DISPLAY DETAILED DATA |
| [ADD MUSIC] [EDIT MUSIC INFORMATION] | | | | | | |

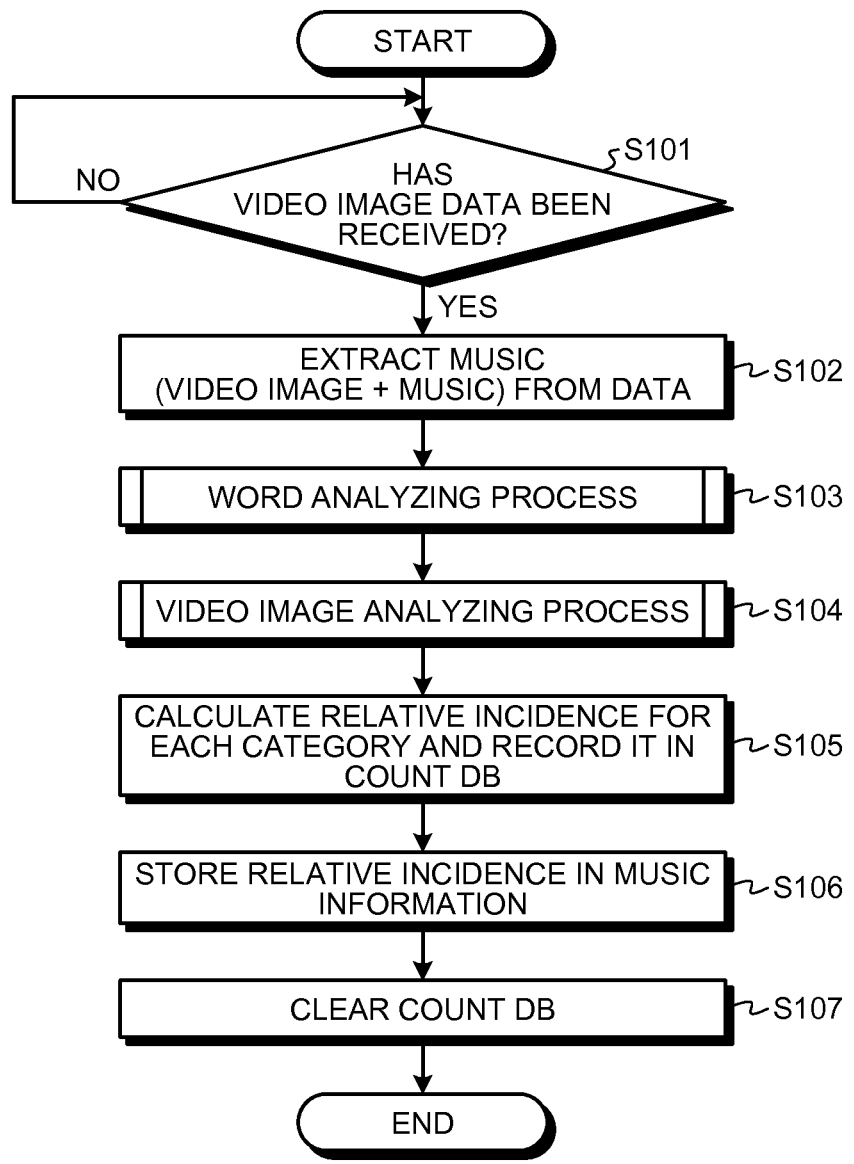

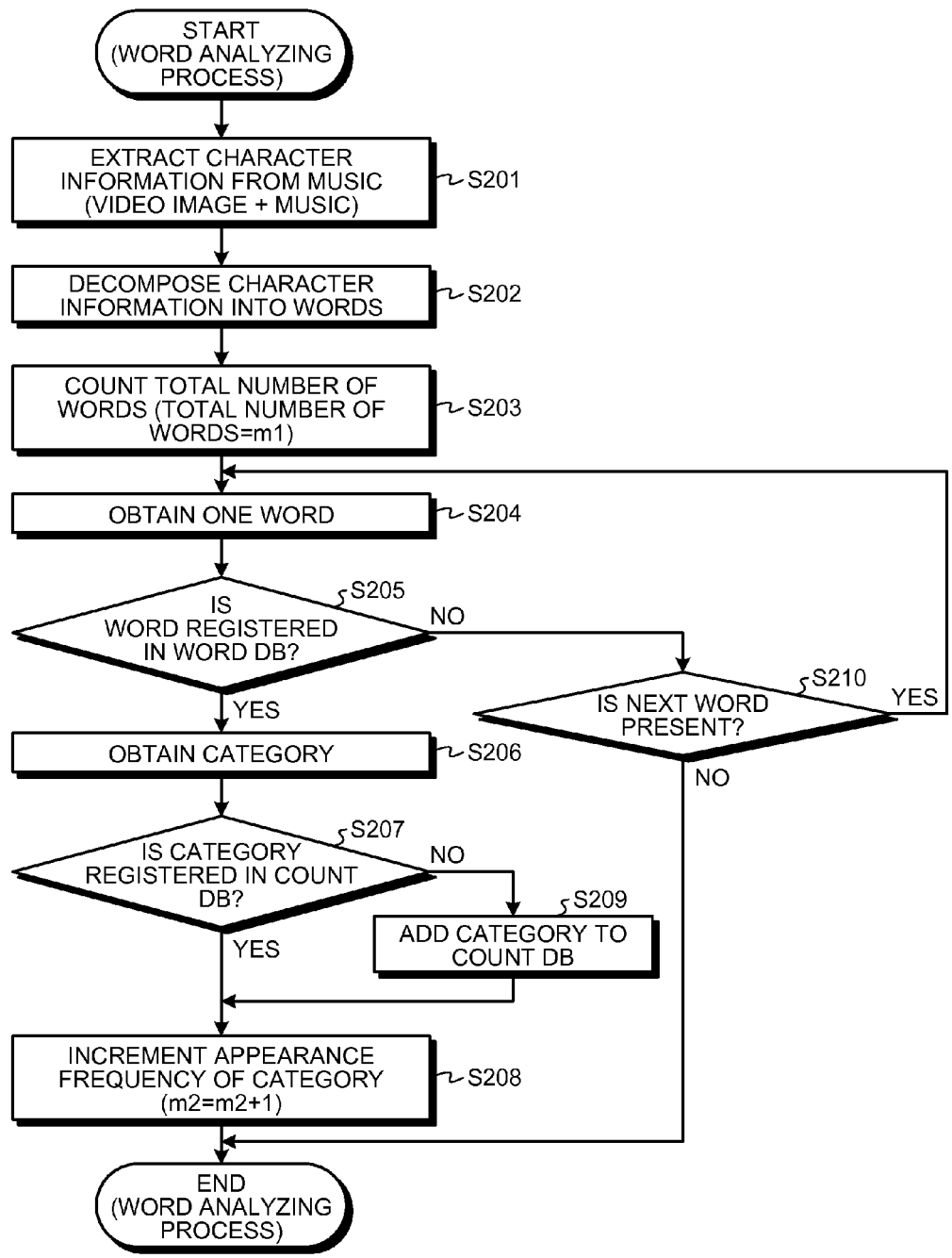

RECORDING MEDIUM, CATEGORY CREATING APPARATUS, AND CATEGORY CREATING METHOD

CROSS-REFERENCE TO RELATED APPLICATION

This application is a continuation application of International Application PCT/JP2010/055451, filed on Mar. 26, 2010, and designating the U.S., the entire contents of which are incorporated herein by reference.

FIELD

The embodiments discussed herein are directed to a category creating program, a category creating apparatus, and a category creating method.

BACKGROUND

It is common practice to use classification techniques that use character information, such as music titles added to the music, composers, and artists, as a method for categorizing music into a list or the like.

For example, in a disclosed method for categorizing music, analog sound that includes multiple pieces of music is converted to digital sound and the start and the end of each piece of music are specified. Subsequently, character recognition is performed on character information (meta information) related to the music in which the start and the end are specified. Then, the music in which the start and the end are specified is associated with the result of the character recognition.

Furthermore, in another disclosed method for categorizing music into multiple pieces, items, such as titles, artist names, genres, review texts, tempos, beats, and rhythm, are extracted from meta information contained in the music. Then, each of the extracted items is associated with the music from which it was extracted.

Patent Document 1: Japanese National Publication of International Patent Application No. 2006-515099
Patent Document 2: Japanese Laid-open Patent Publication No. 2007-26425

However, with the conventional technologies, music is classified using character information that is added to music; therefore, there is a problem in that, if the amount of character information added to the music is small, the music is not accurately classified.

Furthermore, if classification is performed using musical characteristics, such as tempos or tone, without using information added to the music, the classification becomes overly specialized, and thus it is not a general purpose classification that can be used by general users. Furthermore, there may also be a method for classifying music after character information is added to the music; however, character information needs to be created and then added to each piece of music, which takes a lot of time and effort, and thus it is impractical.

SUMMARY

According to an aspect of the embodiment of the invention, a computer-readable recording medium having stored therein a program causing a computer to execute a category creating process comprising: receiving a piece of music; extracting video image information that is included in the music received at the receiving and decomposing the extracted video image information with respect to each characteristic of the extracted video image information; and creating, with respect to each piece of video image information decomposed at the decomposing, a category that represents the characteristic of the piece of video image information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a schematic diagram illustrating an example of information stored in a scene DB.
FIG. 4 is a schematic diagram illustrating an example of the information stored in a word DB.
FIG. 5 is a schematic diagram illustrating an example of information stored in a count DB.
FIG. 6 is a schematic diagram illustrating an example of information stored in a music information DB.
FIG. 7 is a schematic diagram illustrating an example of a music list screen.
FIG. 8 is a schematic diagram illustrating an example of the music list screen in detail.
FIG. 10 is a schematic diagram illustrating an example of a screen displaying lists of pieces of music per different categories.
FIG. 11 is a flowchart illustrating the flow of a process performed by a category creating apparatus according to the second embodiment.
FIG. 12 is a flowchart illustrating the flow of a word analyzing process.

DESCRIPTION OF EMBODIMENTS

Preferred embodiments of a category creating program, a category creating apparatus, and a category creating method disclosed in the present invention will be described in detail below with reference to the accompanying drawings. The present invention is not limited to the embodiments.

Figure 1:
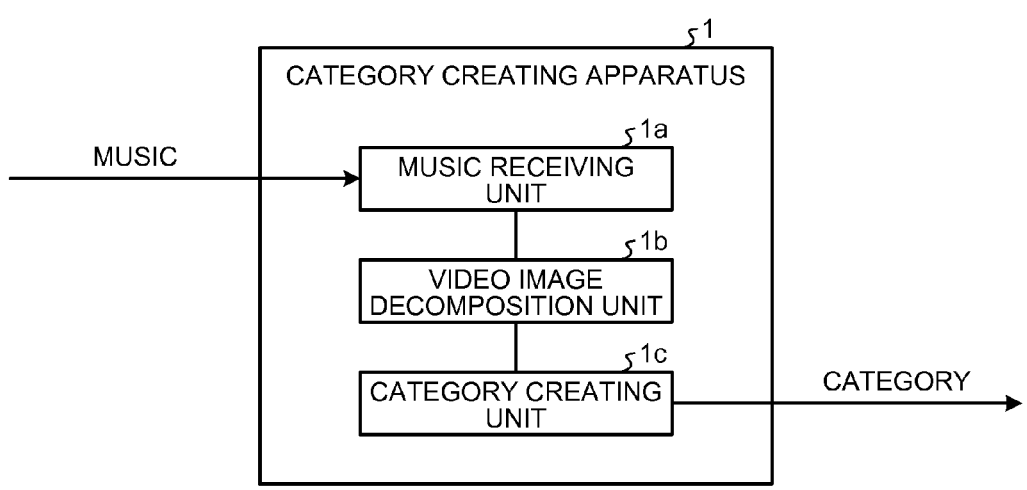
FIG. 1 is a block diagram illustrating the configuration of a category creating apparatus according to a first embodiment.

[a] First Embodiment
FIG. 1 is a block diagram illustrating the configuration of a category creating apparatus according to a first embodiment. A category creating apparatus 1 may also be an information processing apparatus, such as a computer, and can be used with various types of apparatuses, such as apparatuses that use video images including video recording devices that record TV programs or portable video players, or portable music players.

As illustrated in FIG. 1, the category creating apparatus 1 includes a music receiving unit 1a, a video image decomposition unit 1b, and a category creating unit 1c. The music receiving unit 1a receives a piece of music. The music receiving unit 1*a* may also receive a piece of music via a network or a TV program circuit, or may also read information recorded in a storage medium.

The video image decomposition unit 1*b* extracts video image information that is received by the music receiving unit 1*a* and that is included in the music and decomposes the extracted video image information into its characteristics. Then, for the video image information decomposed by the video image decomposition unit 1*b*, the category creating unit 1*c* creates a category representing the characteristics of the video image information. Accordingly, even when the amount of character information that is added to the music is small, the music can be still accurately classified.

[b] Second Embodiment

The category creating apparatus disclosed in the present invention may also include various types of control units other than the control unit illustrated in FIG. 1. Accordingly, in a second embodiment, a description will be given of an example of a category creating apparatus that includes a control unit other than that described in the first embodiment.

[Configuration of the Category Creating Apparatus]

Figure 2:
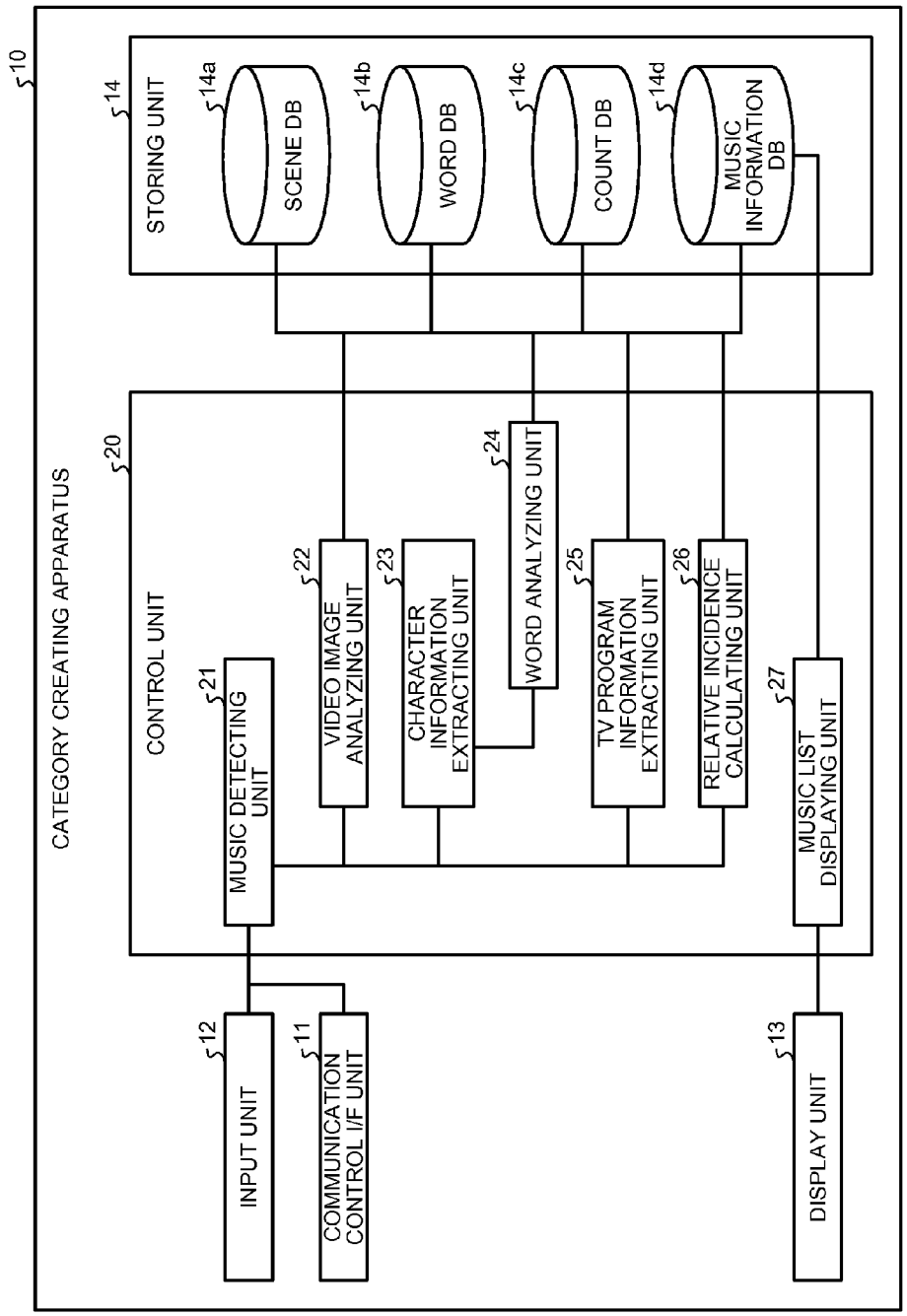
FIG. 2 is a block diagram illustrating the configuration of a category creating apparatus according to a second embodiment.

First, the configuration of a category creating apparatus according to the second embodiment will be described with reference to FIG. 2. FIG. 2 is a block diagram illustrating the configuration of a category creating apparatus according to a second embodiment. As illustrated in FIG. 2, a category creating apparatus 10 includes a communication control I/F unit 11, an input unit 12, a display unit 13, a storing unit 14, and a control unit 20.

The communication control I/F unit 11 is an interface that is connected to another device; includes, for example, a tuner or a set-top box; receives a broadcast television program; and outputs it to a music detecting unit 21, which will be described later. Furthermore, the communication control I/F unit 11 receives, for example, a television program via a network, such as the Internet, and outputs it to the music detecting unit 21.

The input unit 12 is a keyboard or a mouse that receives, from a user, various operations, such as the start or the end of a categorizing process, and outputs the received information to the control unit 20. Furthermore, the input unit 12 can also receive a storage medium, such as a CD or a DVD. Then, the input unit 12 reads information from the received storage medium and outputs it to the music detecting unit 21. The display unit 13, which will be described later, also functions as a pointing device by cooperating with the mouse. The display unit 13 is an output unit that outputs various kinds of information and is a speaker or a monitor that displays the music information that is output by a music list displaying unit 27 which will be described later.

The storing unit 14 is a storage device, such as a semiconductor memory device or a hard disk that stores therein data and programs needed for various processes performed by the control unit 20. The storing unit 14 includes a scene DB 14*a*, a word DB 14*b*, a count DB 14*c*, and a music information DB 14*d*.

The scene DB 14*a* stores therein, in an associated manner, a scene indicating a video image characteristic and a category that the scene could conceivably represent. For example, as illustrated in FIG. 3, the scene DB 14*a* stores therein "1, much snow, snow, winter, white"; "2, with Christmas lights, night, Christmas, and NA"; and the like as the items for "No., scene characteristic, category 1, category 2, category 3", respectively.

The "No." stored in the scene DB 14*a* is an identifier to distinguish records stored in the scene DB 14*a*. The "scene characteristic" is information indicating the scene characteristics obtained when a video image is discomposed. The "category 1, category 2, and category 3" are categories indicating scenes. For example, "1, much snow, snow, winter, white" indicate that a scene having much snow comes under categories of "snow", "winter", and "white". Furthermore, "2, with Christmas lights, night, Christmas, NA" indicate that a scene with Christmas lights comes under categories of "night" and "Christmas". FIG. 3 is a schematic diagram illustrating an example of information stored in a scene DB.

The word DB 14*b* stores therein, in an associated manner, a word and a category that can be associated with the word. For example, as illustrated in FIG. 4, the word DB 14*b* stores therein "1, snow, snow, winter, white"; "2, Santa Claus, Christmas, winter, NA"; and the like as the items for "No., word, category 1, category 2, category 3", respectively.

The "No." stored in the word DB 14*b* is an identifier to distinguish records stored in the word DB 14*b*. The "word" is an obtained word and "category 1", "category 2", and "category 3" are each a category representing the word. For example, "1, snow, snow, winter, white" indicate that the word "snow" comes under the categories of "snow" "winter", and "white". Furthermore, "2, Santa Claus, Christmas, winter, NA" indicate that the word "Santa Claus" comes under the categories of "Christmas", and "winter". FIG. 4 is a schematic diagram illustrating an example of the information stored in a word DB.

The count DB 14*c* temporarily retains various kinds of information created by the control unit 20 in order to perform a weighting on the category related to the extracted music. For example, as illustrated in FIG. 5, the count DB 14*c* stores therein "1, winter, 12, 10, 80%"; "2, Christmas, 11, 0, 40%"; and the like as the items for "No., category, appearance frequency, appearance time (minutes), relative incidence".

The "No." stored in the count DB 14*c* is an identifier to distinguish records stored in the count DB 14*c*. The "category" is a category classified by a word analyzing unit 24 or a video image analyzing unit 22. The "appearance frequency" is the total frequency of appearance of a category and is represented by a coefficient obtained by the word analyzing unit 24, and the "appearance time" is the period of total time, for which a category appears and is represented by a coefficient obtained by the video image analyzing unit 22. The "relative incidence" is the relative frequency of a category calculated by a relative incidence calculating unit 26.

For example, "1, winter, 12, 10, 80%" indicate that the category "winter" appears as a word 12 times in a piece of music, appears as a video image for 10 minutes, and has a relative incidence of 80%. Furthermore, "2, Christmas, 11, 0, 40%" indicate that the category "Christmas" appears as a word 11 times in a piece of music, does not appear as a video image, and has a relative incidence of 40%. FIG. 5 is a schematic diagram illustrating an example of information stored in a count DB.

The music information DB 14*d* stores therein the results of the category classification of the music detected by the music detecting unit 21. For example, as illustrated in FIG. 6, the music information DB 14*d* stores therein "No., file name, start position of the music, end position of the music, TV program title, date and time of broadcast TV program, music title, name of performer of the music, name of lyricist of the music, name of composer of the music, lyrics of the music, category".

In the following, a description will be given of an example of "1, A, 0:11:15, 0:16:30, AAA, 2009.01.02, Christmas song, aaa, aaa, aaa, ABCDE . . . , winter 80%/Christmas 40%". In this example, in the file name "A", the TV program title "AAA" is broadcasted on the date of "2009.01.02", and a piece of music is played between 0:11:15 and 0:16:30 in the program on that date. Furthermore, the title of the music is "Christmas song". The name of the performer of the music, the name of the lyricist of the music, and the composer of the music are "aaa". Furthermore, the lyrics of the Christmas song are "ABCDE . . . , and winter (80%) and Christmas (40%) are created as the category.

In the following, a description will be given of an example of "2, A, 0:32:48, 0:35:11, AAA, 2009.01.02, birthday song, bbb, abc, aaa, FGHIJ . . . , birthday 25%". In this example, in the file name "A", the TV program with the title "AAA" is broadcasted on the date and time of "2009.01.02", and a piece of music is played between 0:32:48 and 0:35:11. Furthermore, the title of the music is "birthday song". The name of the performer of the music is "bbb", the name of the lyricist of the music is "abc", and the composer of the music is "aaa". Furthermore, the lyrics of the birthday song are "FGHIJ" and birthday (25%) is created as the category. FIG. 6 is a schematic diagram illustrating an example of information stored in a music information DB.

The control unit 20 is an electronic circuit, such as a central processing unit (CPU) that includes an internal memory for storing therein a control program, such as an operating system (OS), storing programs prescribing various kinds of procedures, and storing data. The control unit 20 includes the music detecting unit 21, the video image analyzing unit 22, a character information extracting unit 23, a word analyzing unit 24, a TV program information extracting unit 25, the relative incidence calculating unit 26, and the music list displaying unit 27.

The music detecting unit 21 detects a music portion from the video image data on, for example, a program, received by the communication control I/F unit 11 or the input unit 12. For example, the music detecting unit 21 detects, from the video image data, the start of the music and the end of the music; associates them with the file name that indicates the video image data; and stores them in a music information DB 4d. Furthermore, the music detecting unit 21 outputs the received video image data or the music portion extracted from the video image data to the video image analyzing unit 22, the character information extracting unit 23, the TV program information extracting unit 25, and the relative incidence calculating unit 26.

The video image analyzing unit 22 extracts the video image portion in the music portion extracted by the music detecting unit 21; analyzes it; and creates a category (meta information) from the video image characteristics. Then, if the video image analyzing unit 22 completes the creation of the category, the video image analyzing unit 22 outputs a completion notification to the relative incidence calculating unit 26.

In this example, it is assumed that the video image analyzing unit 22 analyzes a video image in a music portion X in a program having the file name A and obtains a scene having "much snow". In such a case, the video image analyzing unit 22 refers to the scene DB 14a and obtains "snow", "winter", and "white" as the categories of a scene having "much snow". Subsequently, the video image analyzing unit 22 calculates the appearance time (for example, 10 minutes) of the music portion X in the scene having "much snow". Then, the video image analyzing unit 22 sets the appearance time of the categories "snow", "winter", and "white", respectively, to 10 minutes and stores them in the count DB 14c.

Furthermore, if the video image analyzing unit 22 does not obtain the scene "with Christmas lights" even when the video image of the music portion X is analyzed, the video image analyzing unit 22 stores, in the count DB 14c, the appearance time of the categories "night" and "Christmas" associated with the scene "with Christmas lights" as zero minutes.

The video image analyzing unit 22 performs the processes described above on all of the scenes obtained from the music portion and calculates the total time at which each category appears in all of the music. Specifically, in addition to the above example, if a category of another scene obtained from the music portion is "snow", the video image analyzing unit 22 measures the appearance time (for example, 5 minutes) of that scene. Then, the video image analyzing unit 22 stores, in the count DB 14c, "snow" and "15 minutes", which are obtained by adding the measured "5 minutes" to "snow" and "10 minutes" that were obtained in the above example.

The character information extracting unit 23 extracts a character portion in the music portion that is extracted by the music detecting unit 21; analyzes it; and obtains information included in the music. Then, the character information extracting unit 23 associates the information included in the obtained music with the file name, the start position of the music, and the end position of the music, which are stored by the music detecting unit 21 in the music information DB 14d, and stores them. Furthermore, the character information extracting unit 23 outputs the character portion extracted from the music portion to the word analyzing unit 24.

For example, the character information extracting unit 23 acquires, from the character portion in the music portion, "music title, performer of the music, lyricist of the music, composer of the music, lyrics of the music" and stores them in the music information DB 14d. The information acquired here can be arbitrarily changed in accordance with the information stored by the music information DB 14d. Furthermore, for the information in which the character portion is not acquired from the music portion, the character information extracting unit 23 stores therein information indicating, for example, "no title" or "unavailable to acquire".

The word analyzing unit 24 creates a category by decomposing a character portion in the music extracted by the character information extracting unit 23 into words. Then, when the word analyzing unit 24 completes the creation of the category, the word analyzing unit 24 outputs a completion notification to the relative incidence calculating unit 26. For example, the word analyzing unit 24 decomposes the "music title" and the "lyrics" extracted by the character information extracting unit 23 into words. Furthermore, the word analyzing unit 24 outputs the obtained total number of words to the relative incidence calculating unit 26.

In this example, it is assumed that the word analyzing unit 24 obtains a word "snow" by analyzing the "music title" and the "lyrics" in the music portion X in the program having the file name A. In such a case, the word analyzing unit 24 refers to the word DB 14b and obtains "snow", "winter", and "white" as categories of the word "snow". Subsequently, the word analyzing unit 24 calculates the appearance frequency (for example, 5 times) of the word "snow" in the music portion X. Then, the word analyzing unit 24 sets the appearance frequency of the categories "snow", "winter", and "white", respectively, to 5 times and stores them in the count DB 14c.

Furthermore, if the word analyzing unit 24 does not obtain the word "dream" even when the character portion in the music portion X is analyzed, the word analyzing unit 24 stores, in the count DB 14c, the appearance time of the categories associated with the word "dream" as zero minutes.

The word analyzing unit 24 performs the processes described above on all of the words obtained from the character portion and calculates the total number of times each category appears in all of the music. Specifically, additionally in the above example, it is assumed that the word analyzing unit 24 obtains the word "Santa Claus" from the character portion. In such a case, the word analyzing unit 24 refers to the word DB 14b and obtains "Christmas" and "winter" as categories of the word "Santa Claus". Subsequently, the word analyzing unit 24 calculates the appearance frequency (for example, 7 times) of the word "Santa Claus" in the music portion X. Then, the word analyzing unit 24 sets the appearance frequency of the categories "snow", "winter", and "white", respectively, to 7 times and stores them in the count DB 14c. At this time, in the above example, because the word analyzing unit 24 has calculated that the "winter" appears "5 times", the word analyzing unit 24 stores, in the count DB 14c, "winter" and "12 times", which are obtained by adding both calculation results together.

Accordingly, for the categories obtained by both the video image analyzing unit 22 and the word analyzing unit 24, both the appearance time and the appearance frequency are stored in the count DB 14c. Furthermore, for the category that is obtained by the video image analyzing unit 22 but that is not obtained by the word analyzing unit 24, the appearance frequency of zero and the calculated appearance time are stored in the count DB 14c. Furthermore, for the category that is not obtained by the video image analyzing unit 22 but that is obtained by the word analyzing unit 24, the appearance time of zero and the calculated appearance frequency are stored in the count DB 14c.

The TV program information extracting unit 25 acquires program information from video image data that is received from the music detecting unit 21. Then, when the TV program information extracting unit 25 completes the acquisition of the program information, the TV program information extracting unit 25 outputs a completion notification to the relative incidence calculating unit 26. For example, if the video image data is information related to, for example, a television program or a recorded program, or information contained in, for example, a DVD, the TV program information extracting unit 25 acquires, from the video image data, "TV program title" and "broadcast date and time". Then, the TV program information extracting unit 25 associates the acquired "TV program title" and "broadcast date and time" with the file name, the start position of the music, and the end position of the music, which are stored in the music information DB 14d by the music detecting unit 21, and stores them.

The relative incidence calculating unit 26 performs a weighting on the category stored in the count DB 14c by using the appearance frequency or the appearance time. For example, the relative incidence calculating unit 26 calculates, from the music information DB 14d, the performance time of the music in which the category stored in the count DB 14c has been detected. Specifically, the relative incidence calculating unit 26 obtains the start position of the music and the end position of the music having the file name of "A" in which the category "winter" has been detected and calculates the performance time based on the obtained data. Furthermore, the relative incidence calculating unit 26 receives, from the word analyzing unit 24, the total number of words obtained from the music in which the category "winter" has been detected.

Then, the relative incidence calculating unit 26 uses, as a weighting, a value calculated using "$(m2+n2)/(m1+n1) \times 100$", where "n2" represents the appearance frequency of the category, "m2" represents the appearance time, "n1" represents the total performance time of the music that contains the category, and "m1" represents the total number of words of the music. Furthermore, the relative incidence calculating unit 26 calculates a weighting by calculating the category stored in the count DB 14c using the above arithmetic expression. Then, the relative incidence calculating unit 26 associates category information, in which the category is associated with the weighting, with a file name, in which the category is obtained, and stores the associated information included in the music information DB 14d.

In this example, it is assumed that the appearance frequency of the category "winter" obtained from the music having the file name "A" is "14", assumed that the appearance time is "10", assumed that the total performance time of the music containing the category is "5", and assumed that the total number of words in the music is "25". In such a case, the relative incidence calculating unit 26 calculates, as a weighting for the category "winter", "$(14+10)/(5+25) \times 100 = 80$". Then, the relative incidence calculating unit 26 stores, in the music information DB 14d, "winter" and "80%" as the category of the file name "A".

The music list displaying unit 27 creates a music list from the information stored in the music information DB 14d in accordance with a request from a user and outputs and displays the created music list on the display unit 13. For example, if the input unit 12 receives an instruction to display a music list from a user, the music list displaying unit 27 displays a music list screen illustrated in FIG. 7. The screen illustrated in FIG. 7 as an example is a screen that displays a music title stored in the music information DB 14d. The music list displaying unit 27 obtains, from the information stored in the music information DB 14d, "title, performer of music, date and time of broadcast TV program, TV program title, category"; adds a "display detailed data" button; and creates the screen illustrated in FIG. 7. With the music list displaying unit 27, by arranging buttons, such as "add music" and "edit music information", a user can perform an editing operation. Specifically, when the user clicks the button "add music" or "edit music information", the user can edit the information stored in the music information DB 14d.

Furthermore, if the "display detailed data" button on the screen illustrated in FIG. 7 is clicked by a user, the music list displaying unit 27 displays detailed information included in the music illustrated in FIG. 8. Specifically, the music list displaying unit 27 displays, as detailed information included in the music, the information stored in the music information DB 14d.

Figure 9:
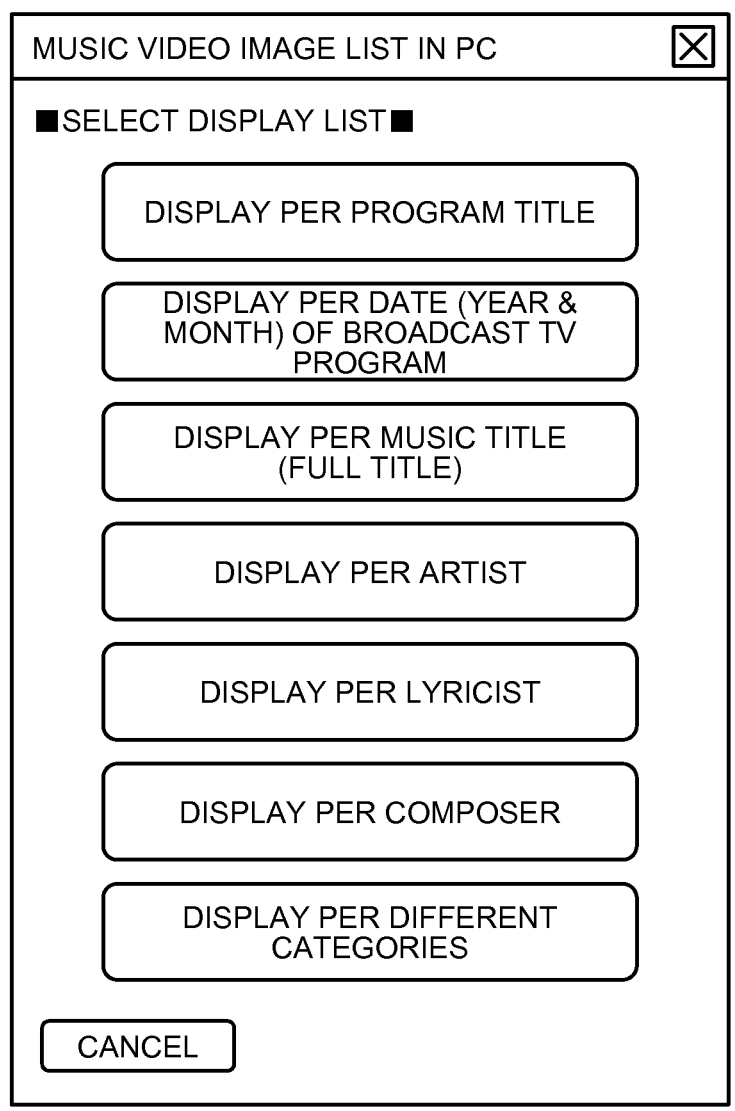
FIG. 9 is a schematic diagram illustrating an example of a menu screen of the music list.

Furthermore, if the input unit 12 receives an instruction to display the music list from a user, the music list displaying unit 27 can also display the menu screen illustrated in FIG. 9. When the music list displaying unit 27 displays the menu screen, it is possible to provide a screen in which information is sorted in the order desired by a user. For example, when the button "display per different categories" on the menu screen illustrated in FIG. 9 is clicked, the music list displaying unit 27 obtains a category from the music information DB 14d and displays, as illustrated in FIG. 10, the music titles that come under the obtained categories "winter" and "farewell", respectively.

Specifically, the music list displaying unit 27 obtains categories from the music information DB 14d and obtains titles containing the obtained categories for each obtained categories. Then, the music list displaying unit 27 displays records associated with the obtained titles for each obtained categories. FIG. 7 is a schematic diagram illustrating an example of a music list screen; FIG. 8 is a schematic diagram illustrating an example of the music list screen in detail; FIG. 9 is a schematic diagram illustrating an example of a menu screen of the music list; and FIG. 10 is a schematic diagram illustrating an example of a screen displaying lists of pieces of music per different categories.

[Flow of a Process Performed by the Category Creating Apparatus]

Figure 13:
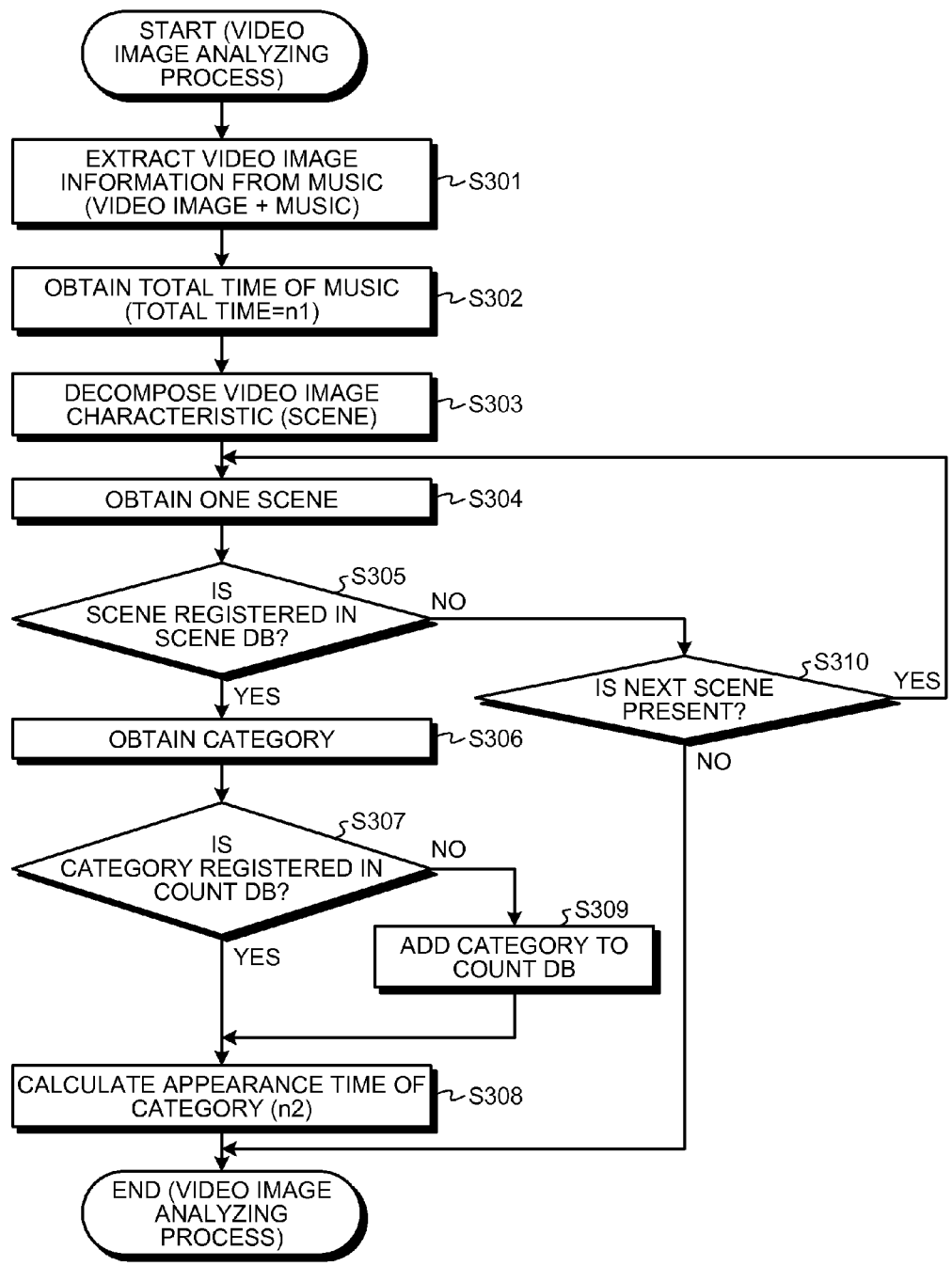
FIG. 13 is a flowchart illustrating the flow of a video image analyzing process.

In the following, the flow of a process performed by the category creating apparatus will be described with reference to FIGS. 11 to 13. FIG. 11 is a flowchart illustrating the flow of a process performed by a category creating apparatus according to the second embodiment; FIG. 12 is a flowchart illustrating the flow of a word analyzing process; and FIG. 13 is a flowchart illustrating the flow of a video image analyzing process.

(Flow of the Process Performed by the Category Creating Apparatus)

As illustrated in FIG. 11, when the music detecting unit 21 in the category creating apparatus 10 receives video image data (Yes at Step S101), the music detecting unit 21 extracts a music portion from the video image data (Step S102).

Subsequently, the word analyzing unit 24 performs a word analyzing process on the character portion in the extracted music, creates a category, and stores the created category in the count DB 14c (Step S103). At this time, the character information extracting unit 23 obtains, from the music as the character information, "music title, performer of the music, lyricist of the music, composer of the music, lyrics of the music" and stores them in the music information DB 14d.

Subsequently, the video image analyzing unit 22 analyzes a video image portion in the music portion extracted by the music detecting unit 21, creates a category from the video image characteristics, and stores the created category in the count DB 14c (Step S104). At this time, the TV program information extracting unit 25 obtains, from the music, "TV program title" and "broadcast date and time" and stores them in the music information DB 14d.

Then, for the category stored in the count DB 14c, the relative incidence calculating unit 26 creates a weighting by using the appearance frequency or the appearance time and stores the created weighting in the count DB 14c (Step S105).

Thereafter, the relative incidence calculating unit 26 stores, in the music information DB 14d for each category stored in the count DB 14c, the appearance frequency, the appearance time, and the weighting (Step S106). Then, the relative incidence calculating unit 26 clears the count DB 14c (Step S107).

(Flow of a Word Analyzing Process)

In the following, the word analyzing process performed at Step S103 illustrated in FIG. 11 will be described. As illustrated in FIG. 12, the word analyzing unit 24 in the category creating apparatus 10 extracts character information from the music (Step S201) and decomposes the extracted character information into words (Step S202). If character information containing words to be analyzed has been extracted by the character information extracting unit 23, there is no need to perform the process at Step S201.

Subsequently, the word analyzing unit 24 counts the total number of words obtained from the character information (Step S203) and obtains one of the obtained words (Step S204). Then, the word analyzing unit 24 determines whether the obtained word is registered in the word DB 14b (Step S205).

Then, if the obtained word is registered in the word DB 14b (Yes at Step S205), the word analyzing unit 24 obtains, from the word DB 14b, the category that is associated with the obtained word (Step S206). Subsequently, the word analyzing unit 24 determines whether the obtained category is registered in the count DB 14c (Step S207).

If the obtained category is registered in the count DB 14c (Yes at Step S207), the word analyzing unit 24 increments the appearance frequency of the obtained category (Step S208).

In contrast, if the obtained category is not registered in the count DB 14c (No at Step S207), the word analyzing unit 24 creates a new record of the obtained category in the count DB 14c and increments the appearance frequency (Step S209).

In contrast, if the obtained word is not registered in the word DB 14b at Step S205 (No at Step S205), the word analyzing unit 24 determines whether a word that has not been subjected to the processes performed at Steps S205 to S208 is present (Step S210).

If an unprocessed word is present (Yes at Step S210), the word analyzing unit 24 obtains the unprocessed word and performs the process at Step S205 and the subsequent processes. In contrast, if an unprocessed word is not present (No at Step S210), the word analyzing unit 24 ends the word analyzing process.

(Flow of the Video Image Analyzing Process)

In the following, the video image analyzing process performed at Step S104 illustrated in FIG. 11 will be described. As illustrated in FIG. 13, the video image analyzing unit 22 in the category creating apparatus 10 extracts video image information from the music (Step S301) and obtains the total time of the music (Step S302). Subsequently, the video image analyzing unit 22 decomposes the extracted video image information for each characteristic (for each scene) (Step S303).

Subsequently, the video image analyzing unit 22 obtains a single scene obtained from the video image information (Step S304) and determines whether the scene is registered in the scene DB 14a (Step S305).

If the obtained scene is registered in the scene DB 14a (Yes at Step S305), the video image analyzing unit 22 obtains a category that is associated with the obtained scene from the scene DB 14a (Step S306). Subsequently, the video image analyzing unit 22 determines whether the obtained category is registered in the count DB 14c (Step S307).

If the obtained category is registered in the count DB 14c (Yes at Step S307), the video image analyzing unit 22 calculates the appearance time (Step S308). In contrast, if the obtained category is not registered in the count DB 14c (No at Step S307), the video image analyzing unit 22 crates a new record of the obtained category in the count DB 14c and measures the appearance time (Step S309).

Furthermore, if the obtained scene is not registered in the scene DB 14a (No at Step S305), the video image analyzing unit 22 determines whether a scene that has not been subjected to the processes at Steps S305 to S308 is present (Step S310).

If an unprocessed scene is present (Yes at Step S310), the video image analyzing unit 22 obtains the unprocessed scene and performs the process at Step S305 and the subsequent processes. In contrast, if an unprocessed scene is not present (No at Step S310), the video image analyzing unit 22 ends the video image analyzing process.

[Advantage of the Second Embodiment]

As described above, according to the second embodiment, even when an amount of meta information contained in a piece of music is small, if the music contains video image information, it is possible to create a category representing the atmosphere of the music from the video image and classify the music by using the meta data. Furthermore, it is possible for a user to be saved trouble of previously adding meta data to the music.

In the conventional technology, even when video images containing pieces of music are stored, it is difficult to search for a desired piece of music and playback the video image until a user inputs meta data and puts the meta data in order by himself/herself. Accordingly, for the purpose of enjoying music, it is not possible to easily utilize collected video images. According to the first embodiment, in addition to saving the user the trouble of inputting meta data, it is possible to add, as meta data, a category from which the contents of the music can be grasped and which it is hard to imagine from the music title; therefore, classification and ordering can be easily performed. Accordingly, the video image data that has been hard to handle becomes data with which a user can easily enjoy the music, and thus it is possible to provide an additional advantage.

[c] Third Embodiment

In the above explanation, a description has been given of the embodiments according to the present invention; however, the embodiments are not limited thereto and the present invention can be implemented with various kinds of embodiments other than the embodiments described above. Therefore, another embodiment will be described below.

(Weighting)

For example, a weighting may also be performed on the categories stored in the word DB 14b and the scene DB 14a. In the example here, it is specifically assumed that a word=snow, category 1=snow×1.2, category 2=winter×1.0, and category 3=white×0.8. This weighting is used when the appearance frequency is calculated. Specifically, the appearance frequency of the category "snow" is calculated to be a factor of 1.2, and the appearance frequency of the category "white" is calculated to be a factor of 0.8.

However, the numbers mentioned in the categories described in the embodiments are only examples and are not limited thereto. Furthermore, in the embodiments, the video image data on the music is automatically detected; however, it is preferable to detect a music portion and add it after arbitrary video image data is manually specified.

(System)

Of the processes described in the embodiments, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings can be arbitrarily changed unless otherwise stated.

The components of each unit illustrated in the drawings are only for conceptually illustrating the functions thereof and are not always physically configured as illustrated in the drawings. In other words, the specific shape of a separate or integrated device is not limited to the drawings; therefore, for example, the character information extracting unit 23 and the word analyzing unit 24 may also be integrated. Specifically, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

(Program)

The various processes performed in the embodiments described above can be implemented by a program prepared in advance and executed by a computer system such as a personal computer or a workstation. Accordingly, in the following, a computer system that executes the program having the same function as that described in the above embodiments will be described as an example.

Figure 14:
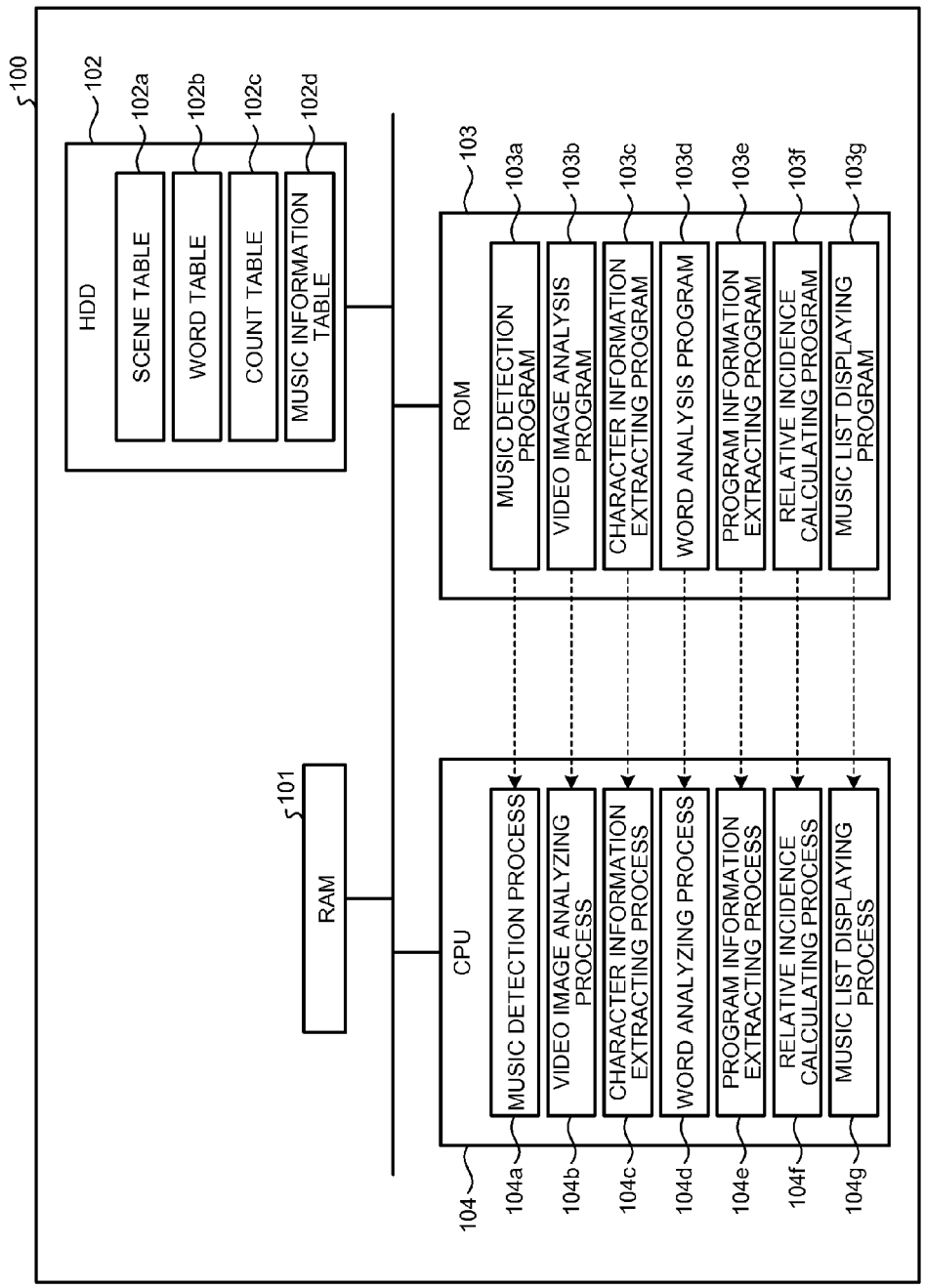
FIG. 14 is a block diagram illustrating an example of a computer system that executes a category creating program.

FIG. 14 is a block diagram illustrating an example of a computer system 100 that executes a category creating program. As illustrated in FIG. 14, the computer system 100 includes a RAM 101, an HDD 102, a ROM 103, and a CPU 104. The ROM 103 stores therein, in advance, programs exhibiting the same functions as the above-described embodiments. Specifically, as illustrated in FIG. 14, the ROM 103 stores therein, in advance, a music detection program 103a, a video image analysis program 103b, a character information extracting program 103c, and a word analysis program 103d. Furthermore, the ROM 103 stores therein, in advance, a program information extracting program 103e, a relative incidence calculating program 103f, and a music list displaying program 103g.

As illustrated in FIG. 14, the CPU 104 reads these programs 103a to 103g and executes them so that these programs 103a to 103g can function as processes illustrated in FIG. 14, i.e., a music detection process 104a, a video image analyzing process 104b, a character information extracting process 104c, a word analyzing process 104d, a program information extracting process 104e, a relative incidence calculating process 104f, and a music list displaying process 104g.

The music detection process 104a corresponds to the music detecting unit 21 illustrated in FIG. 2. Similarly, the video image analyzing process 104b corresponds to the video image analyzing unit 22. The character information extracting process 104c corresponds to the character information extracting unit 23, and the word analyzing process 104d corresponds to the word analyzing unit 24. Furthermore, the program information extracting process 104e corresponds to the TV program information extracting unit 25, the relative incidence calculating process 104f corresponds to the relative incidence calculating unit 26, and the music list displaying process 104g corresponds to the music list displaying unit 27.

The HDD 102 includes a scene table 102a, a word table 102b, a count table 102c, and a music information table 102d. The scene table 102a corresponds to the scene DB 14a illustrated in FIG. 2. Similarly, the word table 102b corresponds to the word DB 14b, the count table 102c corresponds to the count DB 14c, and the music information table 102d corresponds to the music information DB 14d.

The above described programs 103a to 103g are not always stored in the ROM 103. For example, the programs 103a to 103g may also be stored in a "portable physical medium", such as a flexible disk (FD), a CD-ROM, a DVD disk, a magneto-optic (MO) disk, an IC CARD, or the like that can be inserted into the computer system 100. Alternatively, the programs 103a to 103g may also be stored in a "fixed physical medium", such as a hard disk drive (HDD), that can be arranged inside/outside the computer system 100. Alternatively, the programs 103a to 103g may also be stored in "another computer system" connected to the computer system 100 via a public circuit, the Internet, a LAN, a WAN, and the like. The computer system 100 then reads and executes the programs from the above.

Specifically, the programs described in the embodiment can be stored in a computer-readable recording medium, such as the "portable physical medium", the "fixed physical medium", or the "communication medium" described above. Then, the computer system 100 reads the programs from the recording medium and executes them so as to implement the same function as that described in the embodiment. The programs mentioned in this embodiment are not limited to a process performed by the computer system 100. For example, the present invention can also be used in a case in which another computer system or server executes the programs or executes the programs in a cooperative manner.

According to an aspect of an embodiment, with the category creating program, the category creating apparatus, and the category creating method according to the present invention, an advantage is provided in that music can be accurately classified even when the amount of character information added to the music is small.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program causing a computer to execute a category creating process comprising:
   receiving a piece of music;
   extracting video image information that is included in the music received at the receiving and decomposing the extracted video image information with respect to each characteristic of the extracted video image information;
   measuring an appearance time during which a characteristic appears in the music;
   associating, by referring to a characteristic storing unit which stores the characteristic and a plurality of categories that represent the characteristic in an associated manner, the appearance time measured at the measuring with the plurality of categories which are stored in the characteristic storing unit; and
   calculating a total time at which each category appears in the music.

2. The non-transitory computer-readable recording medium according to claim 1, further comprising:
   extracting character information from the video image information included in the music that is received at the receiving; and
   decomposing the character information extracted at the extracting into words, wherein
   the associating includes specifying, by referring to a word storing unit which stores the plurality of categories which are stored in the characteristic storing unit and at least one word in an associated manner, a category that is associated with a word.

3. The non-transitory computer-readable recording medium according to claim 2, wherein
   the measuring includes measuring appearance frequency with which the word associated with the category appears in the music, and
   the associating includes associating the category with the appearance frequency.

4. The non-transitory computer-readable recording medium according to claim 3, wherein the associating includes associating the category with the appearance frequency and the appearance time.

5. The non-transitory computer-readable recording medium according to claim 3, wherein the associating includes calculating, with respect to the category, relative incidence by dividing a value, obtained by adding the appearance frequency to the appearance time, by a value, obtained by adding the total number of words contained in the character information to the total time of the music, and includes associating the category with the relative incidence.

6. A category creating apparatus comprising:
   a memory which stores a characteristic and a plurality of categories that represent the characteristic in an associated manner; and
   a processor coupled to the memory, wherein the processor executes a process comprising:
   receiving a piece of music;
   extracting video image information that is included in the music received at the receiving and decomposing the extracted video image information with respect to each characteristic of the extracted video image information;
   measuring an appearance time during which the characteristic appears in the music;
   associating, by referring to information which stores in the memory, the appearance time measured at the measuring with the plurality of categories which are stored in the characteristic storing unit; and
   calculating a total time at which each category appears in the music.

7. A category creating method performed by an information processing apparatus, the category creating method comprising:
   receiving a piece of music, using a processor;
   extracting video image information that is included in the music received at the receiving and decomposing the extracted video image information with respect to each characteristic of the extracted video image information, using the processor;
   measuring an appearance time during which a characteristic appears in the music;
   associating, by referring to a characteristic storing unit which stores the characteristic and a plurality of categories that represent the characteristic in an associated manner, the appearance time measured at the measuring with the plurality of categories which are stored in the characteristic storing unit; and
   calculating a total time at which each category appears in the music.

* * * * *